United States Patent [19]

Bliamptis

[11] Patent Number: 4,534,525
[45] Date of Patent: Aug. 13, 1985

[54] EVACUATED BALLOON FOR SOLAR ENERGY COLLECTION

[76] Inventor: Emmanuel E. Bliamptis, 20 Phinney Rd., Lexington, Mass. 02173

[21] Appl. No.: 493,386

[22] Filed: May 10, 1983

Related U.S. Application Data

[63] Continuation-in-part of Ser. No. 372,859, Apr. 28, 1982, abandoned, which is a continuation of Ser. No. 171,612, Jul. 23, 1980, abandoned.

[51] Int. Cl.³ .................... B64B 1/58; B64D 27/24
[52] U.S. Cl. .................... 244/30; 244/53 R; 244/62; 244/97; 244/125; 60/641.8; 136/292
[58] Field of Search ............ 244/30, 208, 31, 33, 244/53 R, 97, 62, 125, 127, 128; 60/641.8; 136/292

[56] References Cited

U.S. PATENT DOCUMENTS

| | | | |
|---|---|---|---|
| 1,290,979 | 1/1919 | Griffth | 244/97 |
| 1,390,745 | 9/1921 | Armstrong | 244/30 |
| 2,372,301 | 3/1945 | Stalker | 244/208 |
| 3,012,740 | 12/1961 | Wagner | 244/208 |
| 4,364,532 | 12/1982 | Stark | 60/641.8 |

FOREIGN PATENT DOCUMENTS 2300913 9/1976 France ................. 60/641.8

OTHER PUBLICATIONS

Cherry, "A Concept for Generating Commercial Elec. Power from Sunlight", 8th IEEE Photovoltaic Conf., Aug. 1970.

Primary Examiner—Galen L. Barefoot
Attorney, Agent, or Firm—Donald J. Singer; Jacob N. Erlich

[57] ABSTRACT

A large cylindrically-shaped balloon-like structure having hemispherical ends with fins utilized in conjunction with airflow thereacross based upon Bernoulli's principle for maneuvering and maintaining stability. The balloon is compartmentalized, contains a uniquely designed structural support system, and contains pumps for evacuating the air therein. The structure may be used for any lifting application. In particular solar-energy is collected through a transparent portion of the structure and reflected from shaped surfaces that direct solar energy on energy converting panels. The electrical energy generated is utilized to operate an evacuation system, while the remainder of the electrical energy is beamed by microwaves to a receiving station on earth.

3 Claims, 6 Drawing Figures

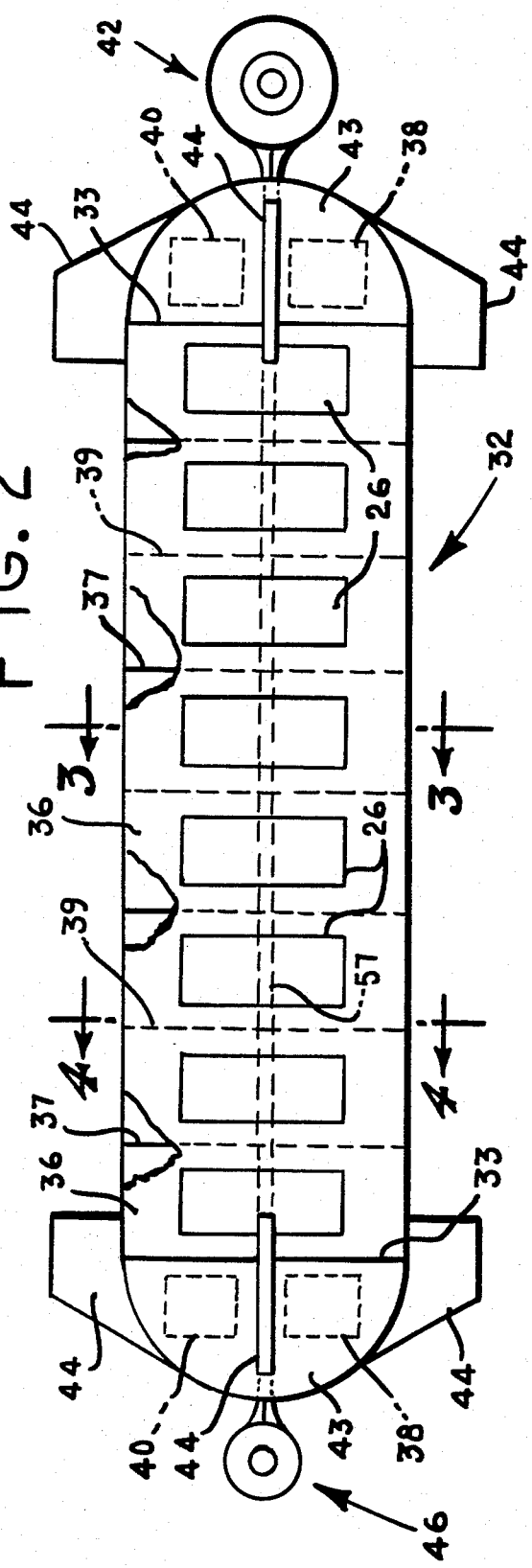
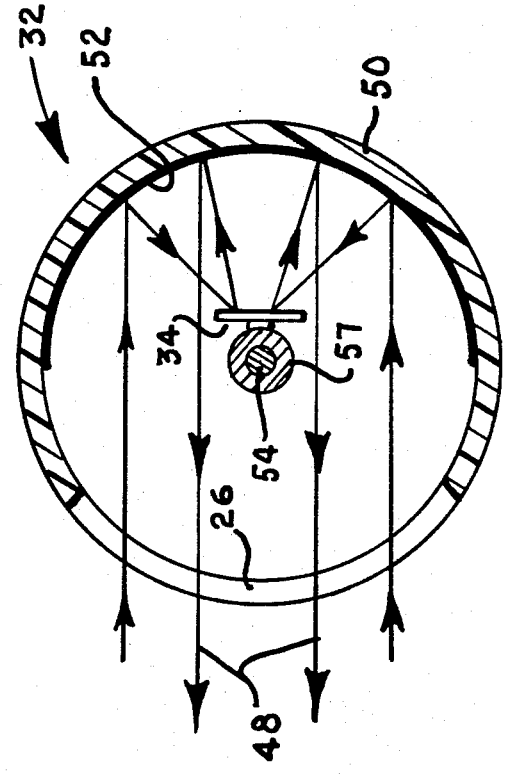
FIG. 2
FIG. 3

EVACUATED BALLOON FOR SOLAR ENERGY COLLECTION

STATEMENT OF GOVERNMENT INTEREST

The invention described herein may be manufactured and used by or for the Government for governmental purposes without the payment of any royalty thereon.

CROSS REFERENCE TO COPENDING U.S. PATENT APPLICATIONS

This patent application is a continuation-in-part of copending U.S. patent application Ser. No. 372,859 filed Apr. 28, 1982, now abandoned, which, in turn, is a continuation of U.S. patent application Ser. No. 171,612 filed on July 23, 1980, now abandoned, all applications being by the same inventor.

BACKGROUND OF THE INVENTION

This invention relates generally to means for the collection and conversion of solar energy and more particularly to an evacuated lifting device for raising and supporting solar collecting equipment in the stratosphere.

In recent years there has been a keen interest in the utilization of energy radiated from the sun to perform work on this planet. Utilization of solar energy also forms part of the planning in space craft and space laboratories where such energy is readily available.

A distinguishing feature between the solar radiation received on the earth and that available to space vehicles is the attenuation created by the atmosphere upon radiation passing through it. While this attenuation is good in many ways and protects us from harmful space radiation it also decreases substantially the value of solar radiation striking the ground.

To date modest advances made in improving the efficiency of solar receiving and converting units have been limited primarily to improving the energy conversion unit. Even with these advances, however, efficiencies remain distressingly low, to the point of being uneconomical and causing an atmosphere of pessimism about the future of solar energy as a viable replacement for fossil fuel on a global basis.

Although numerous small, experimental solar energy devices and systems have been tried there are no large scale solar converting devices which are able to utilize the highly efficient suns rays above the atmosphere to produce energy on the planet earth.

SUMMARY OF THE INVENTION

The invention relates to a large evacuated system stabilized in the stratosphere for collecting and converting solar radiation to electrical energy and beaming microwave energy to consumers on earth.

The evacuated balloon-like structure of the invention is raised to a high elevation above the surface of the earth by means of a buoyant force developed by evacuating the interior of a compartmentalized, substantially air tight structure.

In accordance with the teachings of physics and in particular the principle of Archimedes, an evacuated, airtight device will rise in the atmosphere when its total weight is less than the weight of the air it displaces. The buoyant force developed by a structure of the type discussed herein must be sufficient to overcome the weight of the confining envelope, the supporting struts, vacuum pumps and related equipment. The buoyant force is proportional to the volume of the displaced air, whereas the weight of the total structure is essentially proportional to the outer surface. Therefore, large structures of this form provide higher buoyant force per unit of outer envelope area. It is thus evident that the optimal shape from this point of view is a sphere (since it has the smallest possible surface for a given volume).

There are, however, additional considerations in establishing the shape of the structure. Wind drag forces, for instance would dictate an ellipsoidal shape. The wind drag forces at the elevations of interest are moderate and steady so that it is not necessary to give the structure a true aerodynamic shape. The shape chosen for the invention then is a short cylinder, terminated with two hemispherical caps. A representative size for the embodiment is 400 meters in radius and 2000 meters in length.

Structural integrity is provided within the balloon structure by means of a plurality of spaced apart uniquely designed support struts. These struts are made up of a ring-like structure having a plurality of radially extending spokes or ribs, all of which being made of an inflatable light weight material such as plastic. As the balloon structure ascends above the low elevation turbulence by evacuation of the interior of the balloon structure, the inflatable plastic struts are inflated with either air or helium in order to provide additional rigidity to the structure.

Also within this balloon-like structure are a plurality of solar collectors which collect and focus the sun's rays on solar panels, converting solar energy to electrical energy. Although a small percentage of the electrical energy is utilized to operate evacuating and stabilizing equipment the main portion of the electrical energy is converted to microwaves and beamed to a receiving antenna on earth.

The critical factor for the successful operation of the invention is the elevation at which the solar collector will operate. The winds in the upper atmosphere normally prevail from west to east, however, as the elevation increases the winds reverse direction and flow from east to west. There is a point then where the wind velocity is minimized and this has been found to be at an altitude of approximately 30 km. With the evacuated structure suspended in this nearly windless environment it is possible to control its attitude (orientation) with jets of air on finned surfaces utilizing Bernoulli's principle. Vertical movement of the structure is accomplished by increasing or decreasing buoyancy and hence the altitude at which it will be moved by the desired prevailing wind. After being moved to the desired location it is brought back into the windless environment at the proper altitude.

It has been found that by placing solar collection at an altitude of approximately 30 km there is an increase in available insolation (that is, incident solar radiation) of up to 25-30 percent.

Additional benefits are derived from a longer period of insolation at that altitude as indicated and from the possibility of adjusting the angle of incidence through rough tracking of the sun in azimuth and elevation angle. Furthermore, a system operating at these altitudes is above all clouds and can be used dependably every day regardless of the prevailing weather on the ground.

It is therefore an object of the invention to provide a new and improved evacuated lifting device.

It is another object of the invention to provide a lifting device which can be substantially stationary over a chosen land site or can be moved over long distances following natural atmospheric circulation patterns.

It is another object of the invention to provide a new means for converting solar radiation into electrical energy.

It is a further object of the invention to provide a new and improved means for transferring electrical energy from high altitudes to centers of consumption on earth.

It is another object of the invention to provide a new and improved solar energy collection and conversion system that is more efficient than any similar known device.

It is another object of the invention to provide a solar energy conversion system that will provide extended time for the reception of solar energy.

It is another object of the invention to provide a solar energy conversion system that may be easily moved to any point over the earth in a relatively short time.

It is a further object of the invention to provide an evacuated balloon solar collector which can track the sun in azimuth and elevation.

It is another object of the invention to provide a solar energy collection system that is unaffected by clouds or weather.

It is another object of the invention to provide a high altitude solar collector that may be reached and serviced by balloon.

It is another object of the invention to provide an evacuated lifting device which contains means for self propulsion and can serve as a high elevation platform for diverse applications.

These and other advantages, features and objects of the invention will become more apparent from the following description taken in connection with the illustrative embodiment in the accompanying drawings.

DESCRIPTION OF THE DRAWINGS

FIG. 2 is a side elevation view of the invention;

FIG. 3 is a sectional view of the invention taken along plane 3—3 with the support struts omitted for clarity;

DESCRIPTION OF THE PREFERRED EMBODIMENT

Figure 1:
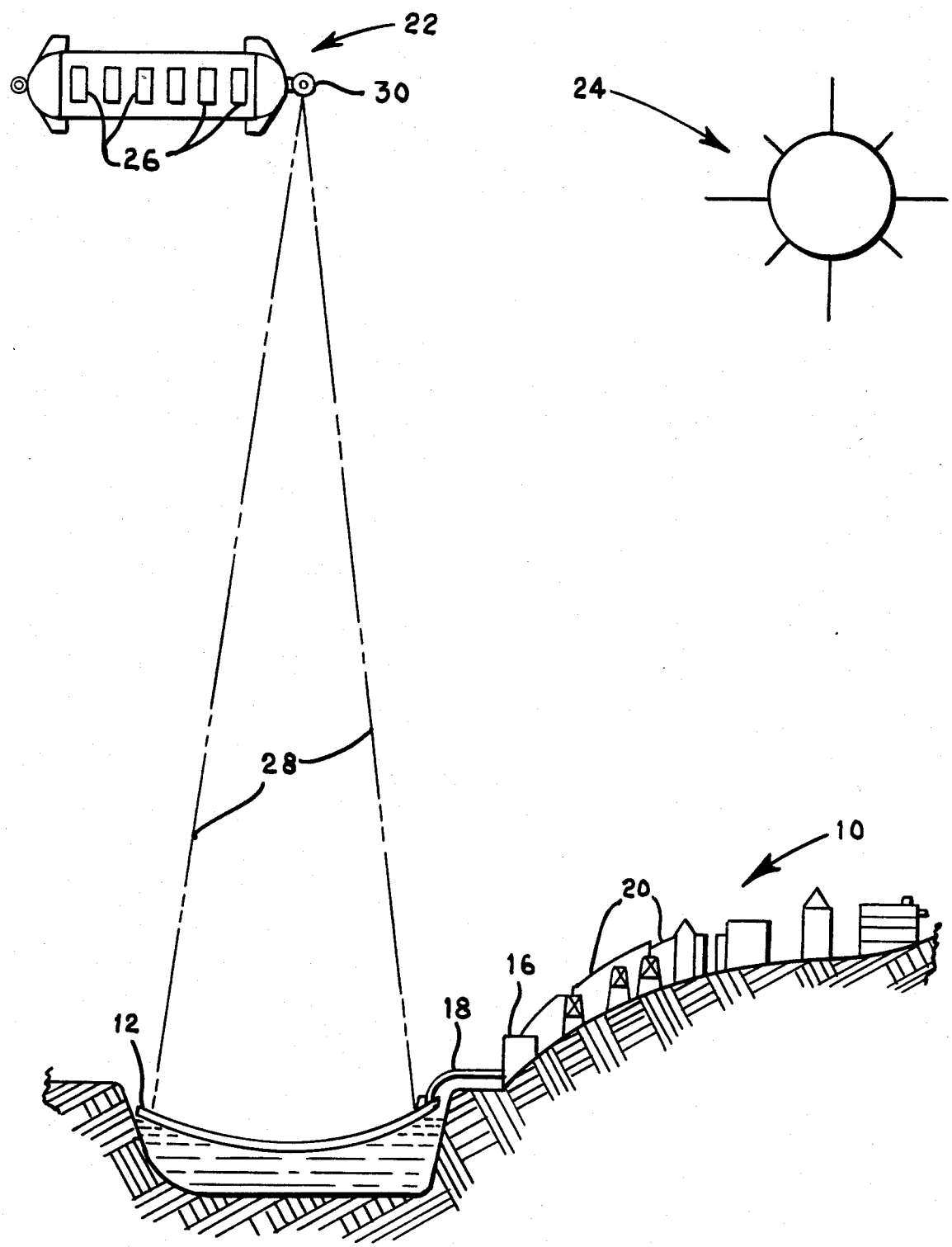
FIG. 1 is a pictorial representation of the total concept of the invention.

Referring now to FIG. 1, a general concept is shown for the practical utilization of the energy converted by the invention. An urban consumption center is shown generally at 10. Nearby is a receiving antenna 12 which, for example, may be shown floating on a lake 14. A power substation 16 located at lake side receives microwave electrical power from the antenna via line 18, reconverts it to usable electrical power and sends it via transmission lines 20 to the consumer.

The invention, in the form of a balloon-like structure 22 floating some 30 km above the lake receives solar energy from the sun 24 through windows 26 and converts that (as will be explained hereinafter) to microwave energy. The microwave energy is beamed (28) to earth via antenna 30. The invention retains its effectiveness even when it is located as far as 50–100 km away from the vertical axis of the receiving antenna. Thus, positional control need not be very precise.

Concerning FIG. 2, the invention is made up of an evacuated balloon-like structure 22 in the form of a chamber 32 made of light weight material having sufficient strength and rigidity to support the designed load. Any space age material having light weight and high strength characteristics is suitable. Substantially one half the circumference of the cylindrical section of chamber 32 is transparent (that is, having a plurality of windows 26 or one large window (not shown) and adapted to receive and pass sunlight. The remainder of the cylinder is opaque and a sufficient portion thereof is coated interiorally with a highly reflective material 52 as shown in FIG. 3. At the focal region of the reflecting surface 52 is a conventional solar panel 34. The solar panel may consist of an array of solar photovoltaic cells, a series of crossed field devices (e.g., amplitrons) or some other solar energy conversion device.

It has been found that a more desirable and efficient form of the invention utilizes a plurality of separate substantially air tight chambers 36 enclosed at each end thereof by side walls 37. Each chamber 36 would have its own mirror 52 and solar panel(s) 34 associated therewith.

Figure 4:
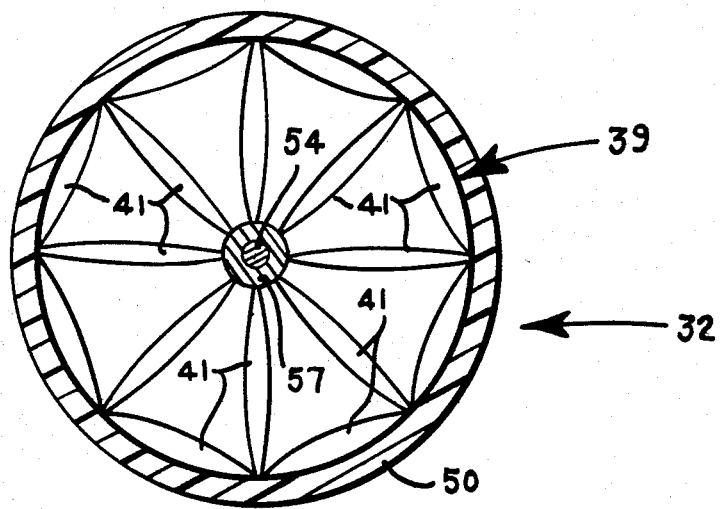
FIG. 4 is a sectional view of the invention taken along plane 4—4.

The rigidity for the overall balloon-like chamber 32 is provided by an axially extending rigid beam 57 which provides support for the internal components thereof as well as for longitudinal and transverse rigidity. In addition, the ends of the cylindrical body of chamber 32 have strut rings 33 made of lightweight, solid tubular material such as aluminum or magnesium. Internal support of chamber 32 is accomplished by means of a plurality of uniquely designed inflatable strut rings 39 made up of rod-shaped air bags 41 as clearly shown in FIG. 4 of the drawing. The air bags are made preferably of a high strength transparent plastic and filled with compressed air or helium to give them rigidity and compression strength. Strut rings 39 may be located at 100 m, 200 m or other appropriate intervals along the longitudinal axis of chamber 32 in order to maintain the desired shape and volume of the structure. The side walls 37 of the substantially airtight compartments 36 would be positioned substantially halfway between strut rings 39. Air or helium could be fed into the inflatable hollow bags 41 as the balloon-like structure 22 of this invention ascends by means of evacuating the interior of chamber 32. In this manner structural rigidity would be maintained throughout ascension. The end caps 43 are constructed with struts (not shown) forming substantially half a regular icosahedron each.

The output from the solar panels 34 is fed through a hollow, cylindrical support beam 57 to mechanical and electrical chambers 38 and 40. The electrical chamber 40 converts approximately ninety percent of the electrical energy to microwave energy and beams it to an earth receiving antenna via transmitting antenna 42. At the receiving antenna the conversion of microwave to commercial power may assume the form of a "rectenna" although other forms of conversion may be used. In an alternative mode each compartment 36 could have its own electrical unit and antenna to separately send microwave energy to different antennas on earth.

Figure 5:
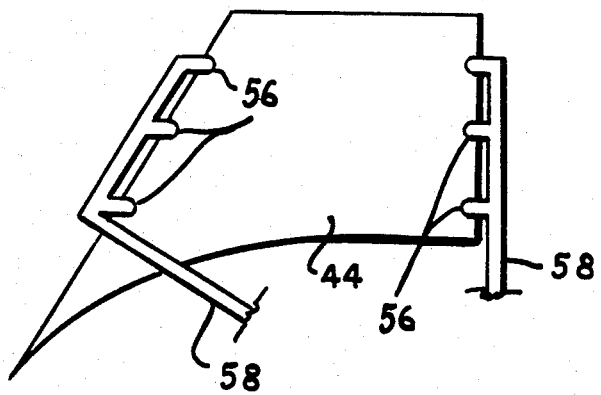
FIG. 5 is a plan view of a directional control and stabilization fin of the invention.
Figure 6:
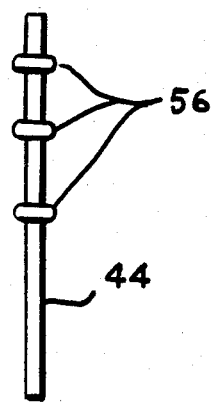
FIG. 6 is an end view of the control and stabilization fin.

Approximately ten percent of the electrical power is supplied to the mechanical chamber 38 which contains or controls evacuating pumps and guidance-stabilization equipment located at appropriate sites within the structure. The evacuation pumps which may be located within mechanical chamber 38 or as indicated above at other sites within structure 22 evacuate the air from chamber 32 in order to position the balloon-like structure 22 of the invention at the desired altitude of approximate 30 km where wind velocity is minimal. Thereafter, it is possible to control the orientation of the balloon-like structure by means of jet streams provided by the air being evacuated. In addition, the evacuated air may be utilized to fill the air bags 41 of the inflatable strut rings 39. Such an arrangement is highly desirable since as the air is evacuated from chamber 32, added rigidity is necessary to maintain the preferred configuration of the balloon-like structure 22. This added rigidity is provided by the inflatable strut rings 39. In order to be cost effective and provide optimum design, it is also possible for the compartments 36 to not be designed perfectly air tight. A small and controlled amount of leakage is acceptable thereby providing air for lifting and maneuvering using Bernoulli's principle to apply jet streams across control surfaces 44 as shown in FIGS. 5 and 6 and described in greater detail hereinbelow.

More specifically, when a body is in a fluid, the pressures all around it are equal. If, however, the fluid is made to flow tangentially on one side of the body then the static pressure at that site decreases, and a net force is generated. The direction of this force (based upon the Bernoulli principle) is basically from the area of highest pressure (lowest fluid velocity) region to the lowest pressure (highest fluid velocity) region. In the present invention, this type of force is generated by the balloon evacuation products and directed through jets 56 on the control surfaces 44 as shown in FIGS. 5 and 6. The control surfaces or fins 44 are rigidly attached to the end strut rings 33.

A small antenna 46 is provided to receive control signals from a ground control station which will send commands to the balloon to insure proper altitude and attitude for maximum efficiency. The structure 22 may be reached by a small balloon for servicing or manned by a crew as appropriate.

FIG. 3 shows the sun's rays 48 passing through transparent windows 26 and reflecting from the focusing mirror surface 52. Reflected rays impinge upon solar panel(s) 34 which is supported by beam 57 and electrical energy is sent via a cable 54 within the support beam 57 to the electrical chamber.

The structure of the invention is essentially that of a frame utilizing a relatively light weight covering material such as mylar. Although some of the frame must be formed of rigid material other members may be formed of flexible plastic or like material and made rigid through filling by compressed air evacuated from the solar compartments.

Although the invention has been described with reference to a particular embodiment, it will be understood to those skilled in the art that the invention is capable of a variety of alternative embodiments within the spirit and scope of the appended claims.

I claim:

1. An evacuated balloon-like device for solar energy collection and microwave energy transmission, said balloon comprising:
   a hollow, substantially cylindrically-shaped structure having hemispherically-shaped end caps, said structure having rigid means and inflatable means within the interior thereof for maintaining said cylindrical shape of said structure, and a plurality of substantially air tight compartments;
   said inflatable means for maintaining said substantially cylindrical shape of said structure including a plurality of spaced apart inflatable strut rings, each of said strut rings having a plurality of inflatable elements, and wherein said inflatable strut rings are capable of being inflated as said structure is evacuated;
   said rigid means including an elongated, hollow, cylindrical longitudinally extending beam;
   means within said structure for evacuating air from said interior of said structure and for utilizing said evacuated air for guiding and stabilizing said structure;
   means forming a portion of said structure for allowing solar radiation to pass therethrough and enter said interior of said structure, and means formed within another portion of said interior of said structure for reflecting and focusing said solar radiation;
   solar panel means within each of said air tight compartments of said structure adjacent said reflecting and focusing means for receiving and collecting said focused solar radiation and converting said solar radiation to electrical energy;
   a plurality of exterior control surfaces and means for passing said evacuated air for guiding said structure over said control surfaces in a regulated fashion so as to control the movement of said structure based upon Bernoulli's principle;
   means within said structure for receiving said electrical energy and converting said electrical energy to microwave energy, and means operably associated with said structure for transmitting said microwave energy;
   means within said structure for receiving said electrical energy and using said electrical energy to operate said evacuating means so as to maintain said evacuation of said structure at a pressure that positions said structure at an altitude of substantial windlessness of approximately 30 km and whereat untethered structure positioning at a fixed relationship to ground can be maintained within minimum effort; and
   means within said structure for distributing a substantial portion of said electrical energy to set electrical energy receiving and converting means and distributing a lesser portion of said electrical energy to said electrical energy receiving and using means;
   whereby said balloon provides a self-contained apparatus for efficiently converting solar energy to a readily usable form of energy.

2. An evacuated balloon-like device as defined in claim 1 wherein said substantial portion of electrical energy is approximately 90 per cent and said lesser portion of electrical energy is approximately 10 per cent.

3. An evacuated balloon-like device as defined in claim 2 wherein said structure has a radius of approximately 400 meters and a length of approximately 2000 meters.

* * * * *